United States Patent [19]

Grimmett et al.

[11] Patent Number: 5,259,018
[45] Date of Patent: Nov. 2, 1993

[54] RADIO TELEPHONE SYSTEM HAVING A HANDSET ADAPTED TO BE REMOVABLY CONNECTED AND CONTAINING A NAM FOR STORING A TELEPHONE NUMBER IDENTIFYING THE HANDSET

[75] Inventors: Alan C. Grimmett, Guildford; N. E. Martensson, Woking, both of England

[73] Assignee: Technophone Limited, England

[21] Appl. No.: 925,516

[22] Filed: Aug. 5, 1992

Related U.S. Application Data

[63] Continuation of Ser. No. 469,249, Jan. 23, 1990, abandoned.

[30] Foreign Application Priority Data

Mar. 17, 1989 [GB] United Kingdom ............... 8906218

[51] Int. Cl.⁵ .................... H04M 11/00; H04B 1/38
[52] U.S. Cl. .................................... 379/58; 455/89
[58] Field of Search ............... 379/56, 58, 60, 61, 379/63, 354, 454; 455/33.1, 56.1, 89, 90

[56] References Cited

U.S. PATENT DOCUMENTS

| D. 297,734 | 9/1988 | Soren et al. ............... D14/64 |
| D. 297,736 | 9/1988 | Krolopp et al. ........... D14/64 |
| D. 304,939 | 12/1989 | Sutoh ...................... D14/138 |
| 4,122,304 | 10/1978 | Mallien, II ............... 379/63 |
| 4,399,330 | 8/1983 | Kuenzel .................. 379/58 |

(List continued on next page.)

FOREIGN PATENT DOCUMENTS

| 0047524 | 9/1981 | European Pat. Off. ............... 379/58 |
| 2613562 | 6/1987 | European Pat. Off. ............... 379/58 |
| 0287061 | 4/1988 | European Pat. Off. ............... 379/58 |
| 0301740 | 7/1988 | European Pat. Off. ............... 379/58 |
| 0281728 | 9/1988 | European Pat. Off. ............... 379/56 |
| 0310876 | 4/1989 | European Pat. Off. . |
| 0369110 | 7/1989 | European Pat. Off. ............... 379/58 |
| 0378775 | 11/1989 | European Pat. Off. ............... 379/58 |
| 63-18824 | 1/1988 | Japan ...................... 379/58 |
| 0121273 | 5/1989 | Japan ...................... 379/61 |

| WO85/02738 | 6/1985 | PCT Int'l Appl. ................ 379/58 |
| 2154395A | 9/1985 | United Kingdom . |
| 2159372A | 11/1985 | United Kingdom ................ 379/58 |

OTHER PUBLICATIONS

RadioShack, 1988 Catalog, pp. 2, 4 and 5.
Motorola, Inc., "Dyna Tac" Cellular Mobile Telephone General Description, Jun. 15, 1983.
Richardson, "Going Portable", Cellular Business, Aug. 1987.
Motorola, "Your Portable Connection", BA-865, Jan. 1989.
Nokia, "The Phone That Works Wonders", Mar. 1991.
Kobayashi, Nishiki, Taga, Sasaki "Detachable Mobile Radio Units for the 800 MHz Land Mobile Radio System" May 1984.
Millicom "Cellular Portable Telephone Manual" Nov. 21, 1984.

Primary Examiner—Jin F. Ng
Assistant Examiner—William D. Cumming
Attorney, Agent, or Firm—Perman & Green

[57] ABSTRACT

A cellular radio telephone system comprises a mobile cellular telephone (1) adapted to have a hand portable telephone (2) containing a number assignment module, i.e. a NAM (7), removably connected thereto. The mobile telephone (1) has a microprocessor (4) which can access the information stored in the NAM (7) of the hand portable telephone (2) either directly or via a memory 16 whereby the mobile automatically assumes the telephone number of the hand portable telephone when the two telephones are connected together. Hence a subscriber need only have a single billing account for both telephones. Also, the same mobile telephone may be used as a host at different times by any number of subscribers having their own hand portable telephones. Each subscriber will be able to receive his own calls and the charges for using the system can be levied to the appropriate subscriber's account.

28 Claims, 4 Drawing Sheets

U.S. PATENT DOCUMENTS

| | | | |
|---|---|---|---|
| 4,593,155 | 6/1986 | Hawkins | 379/62 |
| 4,659,878 | 4/1987 | Dinkins | 370/71 |
| 4,677,653 | 6/1987 | Weiner et al. | 379/58 |
| 4,680,787 | 7/1987 | Marry | 379/63 |
| 4,720,855 | 1/1988 | Ohnishi et al. | 379/354 |
| 4,734,928 | 3/1988 | Weiner et al. | 379/59 |
| 4,742,560 | 5/1988 | Arai | 455/56 |
| 4,745,632 | 5/1988 | Duffy | 379/58 |
| 4,752,949 | 6/1988 | Stenbeck et al. | 379/61 |
| 4,811,377 | 3/1989 | Krolopp et al. | 379/62 |
| 4,845,772 | 7/1989 | Metroka et al. | 379/61 |
| 4,873,711 | 10/1989 | Roberts et al. | 379/58 |
| 4,893,348 | 1/1990 | Andoh | 455/89 |
| 4,916,729 | 4/1990 | Usui | 379/61 |
| 5,020,091 | 5/1991 | Krolopp et al. | 379/58 |
| 5,029,233 | 7/1991 | Metroka | 455/11 |
| 5,054,115 | 10/1991 | Sawa et al. | 455/89 |
| 5,062,132 | 10/1991 | Yasuda et al. | 379/61 |
| 5,142,573 | 8/1992 | Umezawa | 379/454 |
| 5,170,494 | 12/1992 | Levarto | 455/90 |

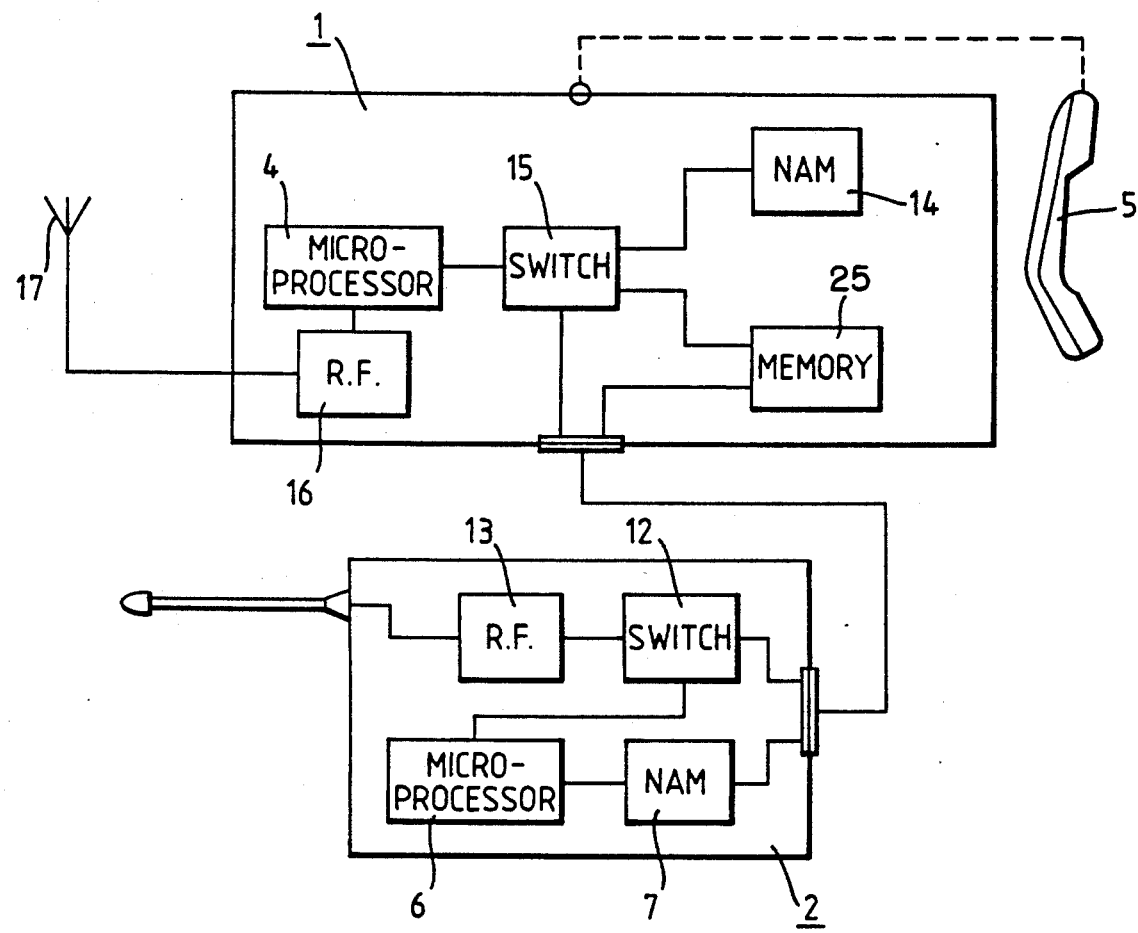

RADIO TELEPHONE SYSTEM HAVING A HANDSET ADAPTED TO BE REMOVABLY CONNECTED AND CONTAINING A NAM FOR STORING A TELEPHONE NUMBER IDENTIFYING THE HANDSET

This is a continuation of copending application Ser. No. 07/469,249 filed on Jan. 23, 1990 now abandoned.

This invention relates to a radio telephone system, particularly but not exclusively a cellular radio telephone system, comprising a host telephone and handset means containing a number assignment module (NAM) in which is stored a unique telephone number.

BACKGROUND OF THE INVENTION

By way of background explanation, the cellular radio telephone system divides a geographical area into a plurality of adjoining cells each including a stationary transmitting and receiving base station connected to the conventional fixed-wire telephone network. Each cell is designed to allow a cellular telephone within the cell to access the fixed-wire network, and vice versa. Hence, the particular cell which receives the transmitting and/or receiving signal of a cellular telephone is the cell which is made operative for transmitting and/or receiving the call. So, for example, when a cellular telephone user attempts to make a call, the cell whose base station receives the strongest signal will be the one which effects the connection for that call. If the cellular telephone then moves beyond the effective range of the cell originally handling the call, another cell which receives the signal more strongly will become operative by an automatic transfer or 'hand-over' system. Hand-over may occur many times during a call depending on the distance travelled by the telephone and the number of effective cells through which the telephone passes.

Each cellular telephone includes a call-channel selector which controls a frequency synthesizer to span the available call-channel frequencies and, in combination with a microprocessor, selects the call-channel received most strongly, i.e. from the cell base station closest to the telephone.

Cellular radio telephones fall into two main categories, namely mobiles and hand portables, although there is also an intermediate category known as transportables. As the name implies, a hand portable telephone is relatively lightweight and small in size and operates from an internal, rechargeable battery pack so that it may readily be carried around by the user. A mobile telephone, on the other hand, is permanently installed in a vehicle and operates from the vehicle's own (higher voltage) power supply. A mobile has the advantage over a hand portable that it can transmit at a higher power level, but a hand portable has the advantage that the user does not need to be in or near a vehicle to use the telephone, since it can be used anywhere within range of a base station. Unlike a mobile telephone, however, a hand portable does have the drawback of having a limited stand-by and call time before the internal battery pack needs to be recharged. Thus, mobiles and hand portables each have their own particular benefits, and it is not uncommon for a subscriber to have both types of telephone, each with its own unique identity, that is to say the mobile telephone would have one telephone number and the hand portable would have a different telephone number, each with its own billing account. Alternatively, a hand portable telephone may be used in the vehicle with a special booster unit operated from the vehicle's power supply, but this involves additional apparatus and more expense.

Conventionally, each cellular telephone—whether mobile or hand portable—has its own unique telephone number by which it may be accessed from other cellular telephones or fixed-wire conventional telephones. The full telephone number is stored in a memory, e.g. a ROM, PROM or RAM known in the art as a 'number assignment module' (NAM) coupled to the control circuits, usually a microprocessor, of the cellular telephone. In the case of mobile telephones the NAM is traditionally contained in the so-called transceiver unit located in a convenient (usually concealed) place separate and remote from the handset, the handset being connected to the transceiver unit.

It is noted that the terms 'number assignment module' and 'NAM' as used herein encompass any memory means, not necessarily modular in form, nor dedicated to the NAM function, in which information pertaining to the identity of the telephone, specifically the telephone number, is stored.

U.S. Pat. No. 4,677,653 and U.S. Pat. No. 4,734,928 disclose an adapter for a cellular mobile telephone which converts the telephone to have any one of several different telephone numbers selected manually by the user. The adapter is provided with a plurality of number assignment modules (i.e. NAMs) in the form of respective ROMs, each storing a unique telephone number. The ROMs (or NAMs) are mounted on a main circuit board in a housing separate from the telephone unit. Each NAM is connected to a multi-position switch so that a selected one of the NAMs may be coupled to the microprocessor of the telephone to change the telephone number. These U.S. patents essentially extend the concept of a cellular telephone having its own unique telephone number by teaching that each telephone may indeed be adapted to have several unique numbers, any one of which may be active (all the others being dormant) at any one time and the user would have a different billing account for each number. Although the same principle could also be applied to hand portable telephones, the overriding doctrine remains to provide cellular telephones with exclusive telephone numbers, that is to say each telephone either has its own individual telephone number or a unique set of telephone numbers exclusive to that particular telephone.

In the neighbouring art of cordless radio telephones, British Patents Nos. 2,154,395 and 2,159,372 disclose an arrangement of handset and base unit, in which the base unit automatically generates and stores an identification code, and then transmits the same code to the handset over the air. The handset stores the code in memory. When an incoming or outgoing call is initiated, the two identification codes stored in the base unit and the handset, respectively, are compared and only if they match is the call allowed to proceed. The identification codes stored in the base unit and handset are thus provided for security purposes i.e. to prevent crosstalk and the risk of wire tapping in that they prevent a handset being used with any base unit other than its intended partner. Provision is made to enable a plurality of handsets to be operable with a common base unit, but each of the handsets can be used only with the particular base unit (or units) to which it is paired and no other. Moreover, in the case of cordless telephones it is noted that the base unit and the handset, although separate, constitute a single telephone and therefore only have one unique telephone number associated therewith. Furthermore, it is noted that this telephone number does not need to be stored in memory within any part of the telephone since the base unit is connected to the fixed-wire telephone network and hence can be addressed in the conventional manner. There is therefore no equivalent of a number assignment module in the case of a cordless telephone.

SUMMARY OF THE INVENTION

According to a first aspect of the present invention there is provided a radio telephone system comprising host radio telephone means and handset means, wherein the host telephone means is adapted to have the handset means removably connected thereto, characterized in that the handset means contains a number assignment module (NAM) in which is stored a number identifying the handset means, the handset means is adapted to provide read access to said NAM from outside the handset means, and the host telephone means is provided with means for accessing said NAM in the handset means whereby the host telephone means assumes automatically the identifying number of the handset means when the handset means is connected to the host telephone means.

In a radio telephone system in accordance with the invention the handset means lends its own inherent identity (telephone number(s)) to the host telephone means while the handset means is temporarily connected to the host. Hence, a common host may be used by any number of different subscribers having their own handset means and they will each be able to make and receive calls on their own personal telephone numbers and the charges for using the system can be levied to the respective subscriber's billing account. Conversely, an individual subscriber may connect his personal handset means to any convenient host telephone means and he will be able to make and receive calls on his personal telephone number and, furthermore, the charges for using the system can be levied to his particular billing account.

The host telephone means may contain its own NAM and so be fully operable as a telephone in its own right with its own unique telephone number. Nevertheless, whenever a handset means containing its own NAM in accordance with the invention is connected thereto, the host will automatically assume the telephone number of the handset means regardless of its own inherent number.

Hence in accordance with a particular embodiment of the invention there is provided a radio telephone comprising a host radio telephone having a first number assignment module (NAM) in which is stored a telephone number identifying the host telephone, and telephone handset means containing a second NAM in which is stored a telephone number identifying the handset means, characterized in that the host telephone is adapted to have the handset means removably connected thereto, the telephone handset means is adapted to provide read access to the second NAM from outside the handset means, and the host telephone is provided with means for accessing the second NAM whereby the host telephone assumes automatically the identifying telephone number of the handset means when the handset means is connected to the host telephone.

The handset means may be a telephone handset unit in its own right or may be a complete hand portable radio telephone. In the latter case the hand portable may be provided with switching means which automatically disable at least some of the R.F. circuits of the hand portable telephone when it is connected to the host, since the host will have the identity of the hand portable and the hand portable telephone is itself otherwise redundant except for possible use as a handset.

The radio telephone system of the invention may suitably be a cellular system. The host telephone may be a mobile cellular telephone and the handset means may be a hand portable cellular telephone. In this case, when the hand portable is connected to the mobile, the mobile assumes the telephone number of the hand portable unit so that both telephones may be operated with the same telephone number.

In a preferred embodiment the radio telephone system includes means capable of detecting the connection of the handset means to the host telephone, wherein the host telephone comprises control circuitry to which the first NAM is coupled, and switching means responsive to the detecting means which disconnect the first NAM from the control circuitry when the handset means is connected to the host telephone. The host thus behaves schizophrenically, resuming its own inherent telephone number when the handset means is disconnected, but assuming the identity of the handset means when the handset means is connected. Such a switching means is not, however, essential. Without it, the host telephone may operate with both telephone numbers simultaneously when the handset means is connected.

In one embodiment the host telephone may be arranged to read the NAM information directly from the handset means whenever the handset means is connected to the host. In an alternative embodiment, the host telephone comprises memory means for storing NAM information from the handset means, and means are provided for transferring information from the NAM of the handset means to the memory means automatically when the handset means is connected to the host.

Means may also be provided for erasing the information stored in the memory means automatically when the handset means is disconnected from the host. Fresh NAM information can thus be stored in the memory means the next time a handset means is connected to the host telephone. Additionally, the handset means may comprise memory means for storing variable information, such as abbreviated dialling codes or frequently used telephone numbers entered by the subscriber, and the host telephone may comprise a corresponding memory, means being provided to download information from the memory means in the handset means to the corresponding memory in the host telephone automatically when the handset means is connected to the host telephone. Similarly, information may be transferred from the host telephone to the handset means.

According to another aspect of the invention there is provided a host radio telephone for use in the radio telephone system in accordance with the first aspect, adapted to have removably connected thereto a telephone handset means containing a number assignment module (NAM) storing a telephone number identifying the handset means, the host telephone having means for accessing the NAM whereby the host telephone automatically assumes the identifying telephone number of the handset means when the handset means is connected to the host telephone.

According to another aspect of the invention there is provided a telephone handset for use as the handset means in the radio telephone system in accordance with the first aspect, adapted to be removably connected to the host telephone and containing a number assignment module (NAM) for storing a telephone number identifying the handset, the handset means being adapted to provide read access to the NAM from outside the handset means.

BRIEF DESCRIPTION OF THE DRAWINGS

Embodiments of the invention will now be described, by way of example, with reference to the accompanying drawings, in which:

FIG. 3 illustrates schematically a third embodiment, and

DETAILED DESCRIPTION OF THE DRAWINGS

Figure 1:
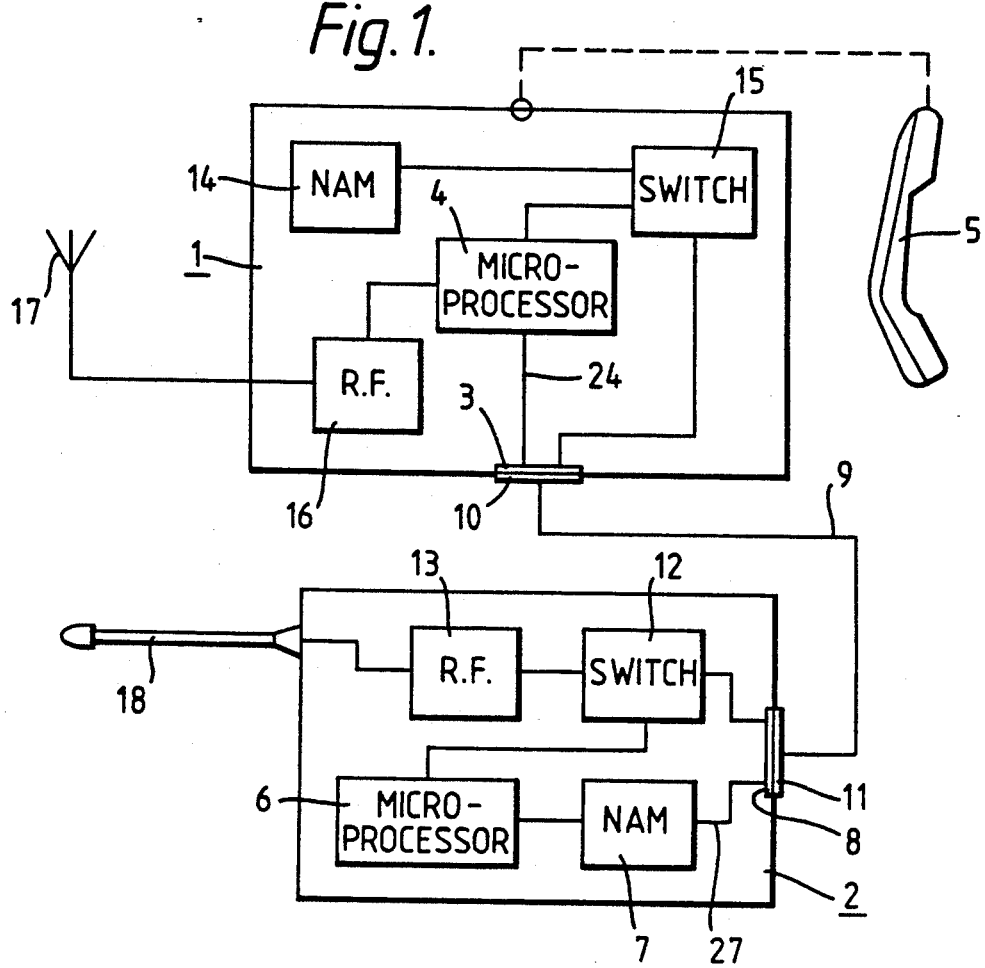
FIG. 1 illustrates schematically a first embodiment of a cellular radio telephone system in accordance with the invention.

Referring to FIG. 1, there is shown schematically a mobile cellular radio telephone 1 connected to a hand portable cellular radio telephone 2. A fixed site cellular transceiver, i.e. a base station, communicates with the mobile and hand portable telephones 1 and 2, in the known manner. As is conventional, the mobile telephone comprises a transceiver with R.F. circuits 16 connected to an external antenna 17 and coupled to a microprocessor 4. The mobile telephone has its own inherent telephone number by virtue of a NAM 14 contained within the main unit of the mobile telephone. A dedicated handset 5 is connected to the main unit in known manner. However, unlike conventional mobile apparatus, the present mobile telephone has an external connector 3, e.g. an 18 pin socket 3, known per se, coupled to the microprocessor 4 of the mobile telephone by an internal data link 24 and the NAM 14 is coupled to the microprocessor 4 via a switch 15 as explained in more detail below.

The hand portable telephone 2 comprises its own microprocessor 6 and a NAM 7 coupled thereto containing the telephone number of the hand portable unit. The NAM 7 is connected by an internal data link 27 to an external connector 8, e.g. an 18 pin socket, on the outer casing of the hand portable telephone 2.

The hand portable and mobile telephones are mutually connected by a wire (electrical) data link 9 having plugs 10 and 11 at opposite ends which mate with sockets 3 and 8 in the mobile and hand portable telephones respectively. A conventional logical switch 12 within the hand portable telephone 2 detects when connection is made to the mobile telephone 1 and disables the R.F. circuits 13 of the hand portable so that the hand portable ceases to operate as an independent radio telephone. When the telephones 1 and 2 are disconnected the switch 12 reconnects the R.F. circuits so that the hand portable telephone 2 resumes normal operation.

When the two telephones 1 and 2 are connected as shown in FIG. 1, the NAM 7 of the hand portable telephone 2 is coupled via a fixed-wire electrical datalink 9, to the microprocessor 4 of the mobile telephone 1. The microprocessor 4 thus has direct access to the telephone number information stored in NAM 7. Also, the NAM 14 of the mobile telephone 1 is coupled to the microprocessor 4 via a conventional logical switch 15 which detects whether or not a hand portable telephone 2 is connected. When the hand portable is connected the switch 15 is opened to disconnect internal NAM 14 so that the microprocessor 4 only has access to the information in the NAM 7 of the hand portable telephone 2, but not to the NAM 14 of the mobile 1. The mobile thus assumes the identity of the hand portable telephone. When the hand portable is disconnected, however, the switch 15 is closed to couple the internal NAM 14 to the microprocessor 4 whereby the mobile resumes its own inherent telephone number.

The hand portable telephone 2 may be used as the handset for the mobile, in which case the audio circuits (not shown) remain operational when the telephones are connected, and this avoids the need for using the dedicated handset 5. However, the hand portable unit may be inconvenient and cumbersome to use as a handset inside a vehicle, because of its relatively heavy weight, fixed antenna, and trailing connector lead 9, in which case the dedicated handset 5, or a conventional so-called "hands-free" apparatus, permanently connected to the mobile unit 1, may be utilised. In this case the audio circuits of the hand portable telephone 2 may also be disabled when the two telephones are connected together.

Figure 2:
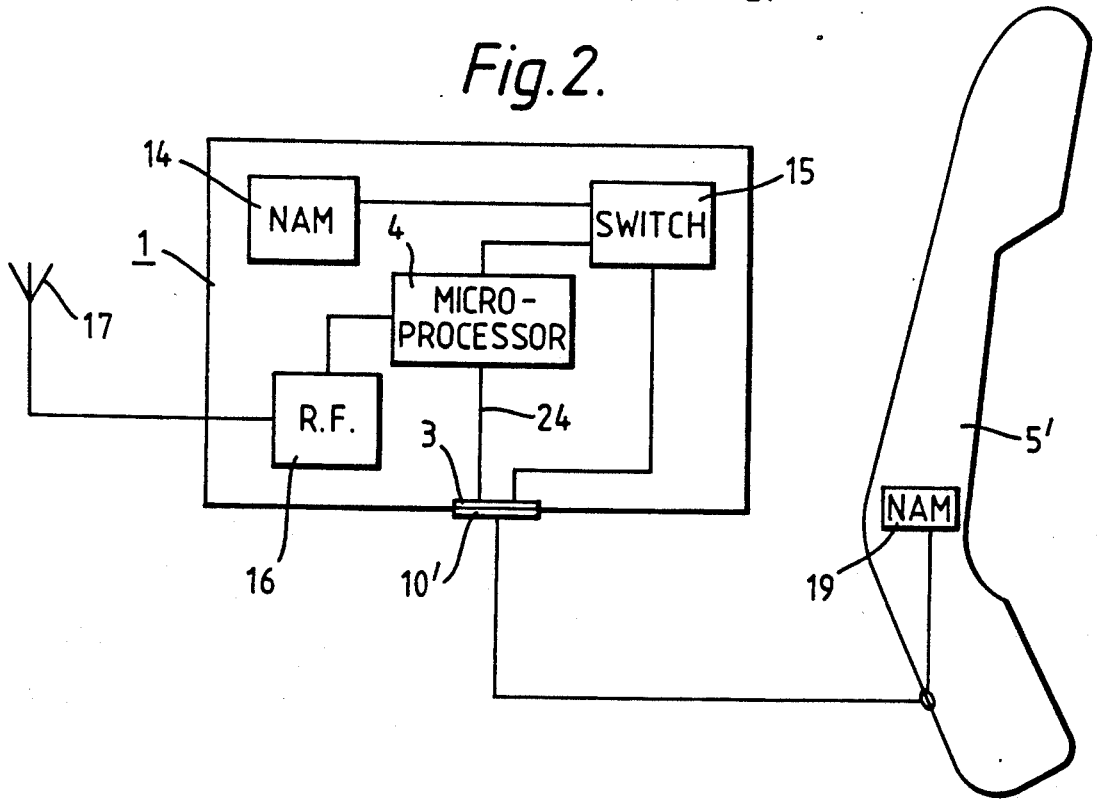
FIG. 2 illustrates schematically a second embodiment of the invention.

FIG. 2 shows an embodiment in which an ancillary handset 5' is removably connected to the mobile telephone 1 via a connector 10'. The handset 5' contains its own NAM 19 in which is stored an exclusive telephone number identifying the handset. Operationally this arrangement is analogous to the previous embodiment with the ancillary handset 5' taking the place of the hand portable telephone 2. Thus, when the handset 5' is connected, the mobile telephone 1 becomes operative with the telephone number in the handset NAM 19. In this case switch 15 is responsive to the connection of an ancillary handset, and disconnects NAM 14 when an ancillary handset 5' is connected.

Figure 2A:
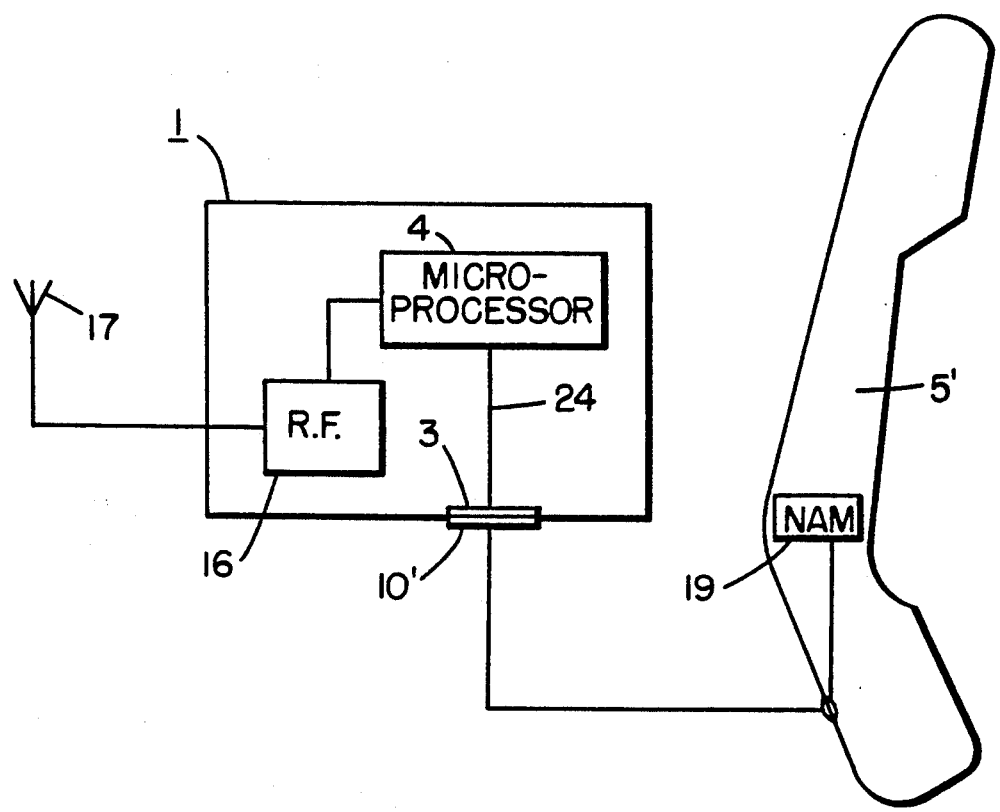
FIG. 2a illustrates schematically an embodiment of the invention wherein a host radio telephone has no independent NAM.

In a modified version of the FIG. 2 embodiment the NAM 14 and switch 15 within the mobile unit may be omitted (as shown in FIG. 2a), the microprocessor 4 simply having direct read access to the NAM 19 in the handset 5' whenever the handset is connected. The mobile unit 1 does not have a dedicated handset and can be regarded as a latent telephone in that it does not contain its own inherent identity and only becomes operable as a telephone when a handset containing its own NAM is connected thereto. This adds a new dimension of versatility to conventional mobile telephones since the same mobile unit can be used by any number of different subscribers equipped with appropriate NAM-containing handsets and the telephone as a whole assumes the identity of the particular handset which is connected for the duration of the connection.

It is noted that what is referred to herein as the mobile unit need not be contained within a single unitary housing. In particular the handset may be connected to a transceiver unit of the telephone via intermediate means, typically a cradle on which the handset is placed either when the telephone is not in use or when it is being used in a "handsfree" mode. The cradle is conventionally fixedly mounted within the passenger compartment of the vehicle for ready access to the handset, whilst the transceiver unit may be located in any convenient place within the vehicle, e.g. in the trunk or beneath one of the seats.

FIG. 3 shows an arrangement in which the mobile telephone 1 also comprises a programmable memory 16 into which information from the NAM 7 in the hand portable telephone is downloaded automatically when the two telephones are connected together. In this case the microprocessor 4 is coupled to the memory 25 rather than directly to the NAM 7. The NAM 14 and memory 25 are coupled to the microprocessor 4 via a switch 15 which detects whether or not a hand portable telephone is connected. When a hand portable is connected, NAM 14 is isolated and memory 25 is coupled to microprocessor 4 so that the mobile telephone assumes the identity of the hand portable telephone 2. When the hand portable telephone is disconnected, memory 25 is isolated and NAM 14 is coupled to the microprocessor 4 so that the mobile telephone resumes its own inherent telephone number. Also, when the hand portable telephone is disconnected the memory 25 may be erased under the control of the microprocessor 4.

As a variation to the FIG. 3 embodiment, the hand-portable telephone 2 may be substituted by an ancillary handset containing its own NAM as described with reference to the previous embodiments.

Figure 4:
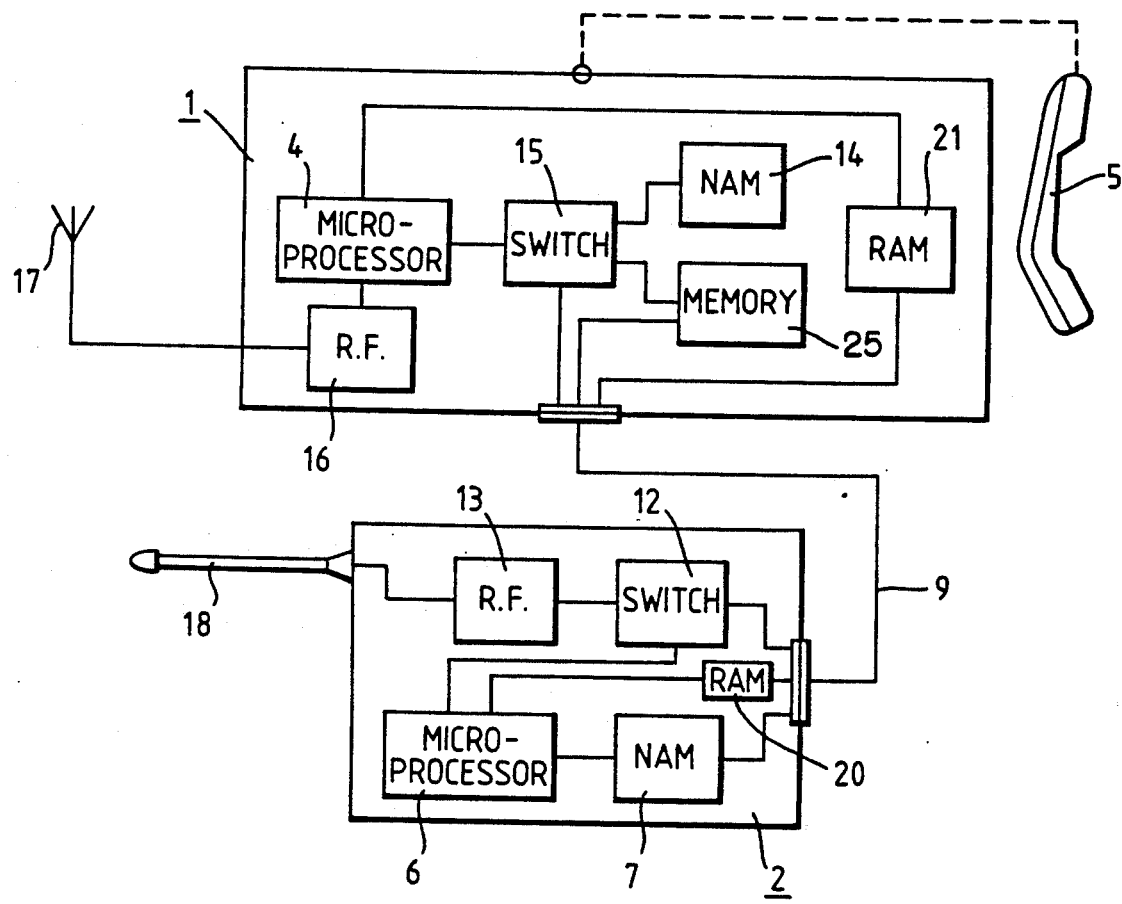
FIG. 4 illustrates schematically a further embodiment of the invention.

FIG. 4 shows a modification of the arrangement in FIG. 3 wherein the hand portable telephone 2 additionally has a random access memory or RAM 20 coupled to microprocessor 6 and the mobile telephone 1 has a corresponding RAM 21 coupled to microprocessor 4. Variable data may be entered into RAM 20 by the user, e.g. abbreviated dialling codes, frequently dialled telephone numbers, or other data. When the telephones 1 and 2 are connected together the data in RAM 20 is compared with data already held in RAM 21. Those memory locations which are not duplicated may be transferred automatically from RAM 20 to RAM 21 via data link 9 in known manner. Hence the mobile telephone 1 may take on not only the telephone number but other data stored in the hand portable telephone without rekeying.

In view of the foregoing description it will be evident that various modifications may be made within the scope of the present invention. For example, it is not necessary for the NAM 14 to be disconnected from the microprocessor 4 when a handportable telephone or ancillary handset is connected to the mobile, since both NAMs may remain coupled whereby the mobile telephone may simultaneously have two (or more) telephone numbers. In this case the switch 15 may be dispensed with. On the other hand the switch 15 need not itself be capable of detecting when an external device is connected to the mobile. Instead this function may be carried out by independent detection means well known to the person skilled in the art and the switch would then operate in response to the detection means, and switching may be effected under software control for example by the internal microprocessor. Furthermore, the NAMs in the telephones or the ancillary handset are not restricted to containing a single telephone number, but may contain several different numbers. As regards the data link between the two telephones this need not be a fixed-wire electrical link (as described), but may alternatively be an optical or radio data link.

Finally, it is noted that the invention is not limited to cellular radio telephone systems, but applies equally to any radio telephone system, for example the discrete area system known in the UK as CT2.

We claim:

1. A radio telephone for communicating on a radio system having at least one fixed site and a plurality of radio telephones, comprising:

handset means, only operative for communication with a fixed site when interconnected with a host telephone means, including handset number assignment means for storing a handset numeric identifier, and data link means for providing connection to said handset number assignment means by an entity external to said handset means; host telephone means external to said handset means including means for accessing said handset number assignment means when said handset means is interconnected with said host telephone means, said host telephone means assuming said numeric identifier of said handset means for communicating with a fixed site both for outgoing and incoming calls, memory means for storing said handset numeric identifier from said handset number assignment means, and means for automatically enabling transfer of said handset numeric identifier from said handset number assignment means to said memory means when said handset means is interconnected with said host telephone means, and for further controlling erasure of said handset numeric identifier from said memory means when said handset means is disconnected from said host telephone means; and interconnection means for removably interconnecting said handset means with said host telephone means.

2. The radio telephone as claimed in claim 1 wherein said host telephone means further comprises:

host number assignment means for storing a host numeric identifier identifying said host telephone means.

3. A radio telephone as claimed in claim 2 further comprising:

means for detecting the interconnection of said handset means with the host telephone means;

control circuitry, in said host telephone means, coupled to said host number assignment means; and switching means responsive to said interconnection detecting means for disconnecting said host number assignment means from said control circuitry when said handset means is interconnected with the host telephone means.

4. A radio telephone as claimed in claim 2 wherein the handset means further comprises memory means for storing variable information, and the host telephone means further comprises corresponding memory means, and further including:

means for automatically enabling transfer of information from the memory means in the handset means to the corresponding memory means in the host telephone means when the handset means is interconnected with the host telephone means.

5. A radio telephone as claimed in claim 3, wherein the host telephone means further comprises:

re-programmable memory means for storing information from the handset number assignment means; and means for automatically enabling transfer of information from the handset number assignment means to the re-programmable memory means when said handset means is connected to the host telephone.

6. A radio telephone as claimed in claim, 5 wherein the switching means is resident in the host telephone means and couples the re-programmable memory means to said control circuitry when the handset means is connected to the host telephone means.

7. A radio telephone arrangement for communicating on a radio system having at least one fixed site and a plurality of radio telephones, comprising:
handset means, including handset number assignment means having plural unique sets of handset numeric identifiers, and data link means for providing connection to said handset number assignment means by an entity external to said handset means;
host telephone means external to said handset means, including means for accessing said handset number assignment means and storing at least one said set of unique numeric identifiers in a memory in said host telephone means when said handset means is interconnected with said host telephone means, said host telephone means thereby assuming said stored set of numeric identifiers from said handset means, said host telephone means being operable for communication with said fixed site with said stored set of numeric identifiers; interconnection means for removably interconnecting said handset means with said host telephone means; and
means in said host telephone means for erasing said set of unique numeric identifiers from said handset means stored in said memory when the handset means is disconnected from the host telephone means.

8. The radio telephone arrangement as claimed in claim 7 wherein said host telephone means further comprises:
host number assignment means for storing a host numeric identifier identifying said host telephone means.

9. A radio telephone arrangement as claimed in claim 7, wherein the handset means is a hand portable radio telephone including RF circuits.

10. A radio telephone arrangement as claimed in claim 9, further comprising: means for detecting an interconnection of the hand portable telephone with the host telephone means; and
switching means in said hand portable radio telephone, responsive to said detecting means, for disabling said R.F. circuits in said hand portable telephone when the hand portable telephone is interconnected with the host telephone means.

11. A radio telephone arrangement as claimed in claim 8, further comprising:
means for detecting the interconnection of said handset means with the host telephone means;
control circuitry, in said host telephone means, coupled to said host number assignment means; and
switching means responsive to said interconnection detecting means for disconnecting said host number assignment means from said control circuitry when said handset means is interconnected with the host telephone means.

12. A radio telephone arrangement as claimed in claim 8 wherein the handset means further comprises memory means for storing variable information, and the host telephone means further comprises corresponding memory means, and further including:
means for automatically enabling transfer of information from the memory means in the handset means to the corresponding memory means in the host telephone means when the handset means is interconnected with the host telephone means.

13. A radio telephone arrangement as claimed in claim 11, wherein the host telephone means further comprises:
means for automatically enabling transfer of information from the handset number assignment means to the memory when said handset means is connected to the host telephone.

14. A radio telephone arrangement as claimed in claim 13, wherein the switching means is resident in the host telephone means and couples the memory to said control circuitry when the handset means is connected to the host telephone means.

15. A radio telephone arrangement for communicating on a radio system having at least one fixed site and a plurality of radio telephones, comprising:
handset means, including handset number assignment means having plural unique sets of handset numeric identifiers, and data link means for providing connection to said handset number assignment means by an entity external to said handset means;
host telephone means external to said handset means, including means for accessing said handset number assignment means and storing at least one said set of unique numeric identifiers in a memory in said host telephone means when said handset means is interconnected with said host telephone means, said host telephone means thereby assuming said stored set of numeric identifiers from said handset means, said host telephone means being operable for communication with said fixed site with said stored set of numeric identifiers;
interconnection means for removably interconnecting said handset means with said host telephone means; and
means in said host telephone means for preventing access to said set of unique numeric identifiers stored in said memory from said handset means when said handset means is disconnected from said host telephone means.

16. The radio telephone arrangement as claimed in claim 15 wherein said host telephone means further comprises:
host number assignment means for storing a host numeric identifier identifying said host telephone means.

17. A radio telephone arrangement as claimed in claim 15, wherein the handset means is a hand portable radio telephone including RF circuits.

18. A radio telephone arrangement as claimed in claim 17, further comprising:
means for detecting an interconnection of the hand portable telephone with the host telephone means; and
switching means in said hand portable radio telephone, responsive to said detecting means, for disabling said RF circuits in said hand portable telephone when the hand portable telephone is interconnected with the host telephone means.

19. A radio telephone arrangement as claimed in claim 16, further comprising:
means for detecting the interconnection of said handset means with the host telephone means;

control circuitry, in said host telephone means, coupled to said host number assignment means; and switching means responsive to said interconnection detecting means for disconnecting said host number assignment means from said control circuitry when said handset means is interconnected with the host telephone means.

20. A radio telephone arrangement as claimed in claim 16 wherein the handset means further comprises memory means for storing variable information, and the host telephone means further comprises corresponding memory means, and further including:

means for automatically enabling transfer of information from the memory in the handset means to the corresponding memory in the host telephone means when the handset means is interconnected with the host telephone means.

21. A radio telephone arrangement as claimed in claim 19, wherein the host telephone means further comprises:

means for automatically enabling transfer of information from the handset number assignment means to the memory when said handset means is connected to the host telephone.

22. A radio telephone arrangement as claimed in claim 21, wherein the switching means is resident in the host telephone means and couples the memory to said control circuitry when the handset means is connected to the host telephone means.

23. A radio telephone for communicating on a radio system having at least one fixed site and a plurality of radio telephones, comprising:

handset means, only operative for communication with a fixed site when interconnected with a host telephone means, including handset number assignment means for storing a handset numeric identifier, and data link means for providing connection to said handset number assignment means by an entity external to said handset means;

host telephone means external to said handset means, including means for accessing said handset number assignment means when said handset means is interconnected with said host telephone means, said host telephone means assuming said numeric identifier of said handset means for communicating with a fixed site both for outgoing and incoming calls, memory means for storing said handset numeric identifier from said handset number assignment means, means for automatically enabling transfer of said handset numeric identifier from said handset number assignment means to said memory means when said handset means is interconnected with said host telephone means, and means for preventing access to said handset numeric identifier stored in said memory means when said handset means is disconnected from the host telephone means; and interconnection means for removably interconnecting said handset means with said host telephone means.

24. The radio telephone as claimed in claim 23 wherein said host telephone means further comprises:

host number assignment means for storing a host numeric identifier identifying said host telephone means.

25. A radio telephone as claimed in claim 24 further comprising:

means for detecting the interconnection of said handset means with the host telephone means;

control circuitry, in said host telephone means, coupled to said host number assignment means; and switching means responsive to said interconnection detecting means for disconnecting said host number assignment means from said control circuitry when said handset means is interconnected with the host telephone means.

26. A radio telephone as claimed in claim 24 wherein the handset means further comprises memory means for storing variable information, and the host telephone means further comprises corresponding memory means, and further including:

means for automatically enabling transfer of information from the memory means in the handset means to the corresponding memory means in the host telephone means when the handset means is interconnected with the host telephone means.

27. A radio telephone as claimed in claim 25, wherein the host telephone means further comprises:

re-programmable memory means for storing information from the handset number assignment means; and means for automatically enabling transfer of information from the handset number assignment means to the re-programmable memory means when said handset means is connected to the host telephone.

28. A radio telephone as claimed in claim 27, wherein the switching means is resident in the host telephone means and couples the re-programmable memory means to said control circuitry when the handset means is connected to the host telephone means.

* * * * *